(12) United States Patent
Wan et al.

(10) Patent No.: US 11,774,803 B1
(45) Date of Patent: Oct. 3, 2023

(54) OPTICAL FILM AND PREPARATION METHOD THEREFOR, AND DISPLAY DEVICE

(71) Applicant: HKC CORPORATION LIMITED, Shenzhen (CN)

(72) Inventors: Ye Wan, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/092,192

(22) Filed: Dec. 30, 2022

(30) Foreign Application Priority Data

Jun. 20, 2022 (CN) .......................... 202210697810.1

(51) Int. Cl.
*G02F 1/13357* (2006.01)
*G02F 1/09* (2006.01)
(Continued)

(52) U.S. Cl.
CPC ....... *G02F 1/13362* (2013.01); *G02B 6/0028* (2013.01); *G02B 6/0031* (2013.01);
(Continued)

(58) Field of Classification Search
CPC ...... G02F 1/13362; G02F 1/0136; G02F 1/09; G02F 1/133605; G02F 1/133608;
(Continued)

(56) References Cited

U.S. PATENT DOCUMENTS

| 2008/0198294 A1 | 8/2008 | Hwang et al. |
| 2008/0198302 A1 | 8/2008 | Cho |
| (Continued) | | |

FOREIGN PATENT DOCUMENTS

| CN | 101246232 A | 8/2008 |
| CN | 102789013 A | 11/2012 |
| (Continued) | | |

OTHER PUBLICATIONS

JP 2008310077 A (Year: 2008).*
(Continued)

*Primary Examiner* — James A Dudek
(74) *Attorney, Agent, or Firm* — Franklin & Associates International Inc; Matthew F. Lambrinos

(57) ABSTRACT

The present disclosure relates to an optical film and a preparation method therefor, and a display device. This optical film comprises a light transmitting substrate as well as a magnetic powder and a magneto-optical medium disposed in the light transmitting substrate, the magnetic powder is used for forming a surface magnetic field, and the magneto-optical medium is located in the surface magnetic field, so that a polarization direction of linearly polarized light is rotated after the linearly polarized light passes through the magneto-optical medium. When being applied to a backlight module, this optical film can convert natural light emitted by the backlight module into polarized light in a required polarization direction as much as possible, thereby increasing the utilization ratio of backlight.

20 Claims, 4 Drawing Sheets

(51) Int. Cl.
*F21V 8/00* (2006.01)
*G02F 1/01* (2006.01)

(52) U.S. Cl.
CPC ......... *G02B 6/0053* (2013.01); *G02B 6/0088* (2013.01); *G02F 1/0136* (2013.01); *G02F 1/09* (2013.01); *G02F 1/133605* (2013.01); *G02F 1/133608* (2013.01); *G02F 1/133611* (2013.01); *G02F 2201/50* (2013.01)

(58) Field of Classification Search
CPC ........... G02F 1/133611; G02F 2201/50; G02B 6/0028; G02B 6/0031; G02B 6/0053; G02B 6/0088
See application file for complete search history.

(56) References Cited

U.S. PATENT DOCUMENTS

| | | | |
|---|---|---|---|
| 2017/0108726 A1 | 4/2017 | Yanai et al. | |
| 2018/0045986 A1 | 2/2018 | Chen et al. | |
| 2018/0136518 A1 | 5/2018 | Min et al. | |
| 2022/0042959 A1 | 2/2022 | Yamane et al. | |

FOREIGN PATENT DOCUMENTS

| | | | |
|---|---|---|---|
| CN | 106094341 | A | 11/2016 |
| CN | 110806648 | A | 2/2020 |
| CN | 111307723 | A | 6/2020 |
| CN | 113093412 | A | 7/2021 |
| CN | 113867038 | A | 12/2021 |
| CN | 114280834 | A | 4/2022 |
| JP | H09230298 | A | 9/1997 |
| JP | H1054965 | A | 2/1998 |
| JP | H1184330 | A | 3/1999 |
| JP | 2002107684 | A | 4/2002 |
| JP | 2004029776 | A | 1/2004 |
| JP | 2005241803 | A | 9/2005 |
| JP | 2008310077 | A | 12/2008 |
| JP | 2009282210 | A | 12/2009 |
| JP | 2009283234 | A | 12/2009 |
| JP | 2010210824 | A | 9/2010 |
| JP | 2013130715 | A | 7/2013 |
| JP | 2013137209 | A | 7/2013 |
| JP | 2016012047 | A | 1/2016 |

OTHER PUBLICATIONS

JP H09259482 A (Year: 1997).*
Nonlinear Faraday rotation in electromagnetically induced transparency medium of semiconductor three quantum dots, 9 pages.
Wireless Sensor Networks, First European Workshop, EWSN 2004, Berlin Germany, Jan. 2004 Proceedings, 376 pages.

\* cited by examiner

OPTICAL FILM AND PREPARATION METHOD THEREFOR, AND DISPLAY DEVICE

CROSS-REFERENCE TO RELATED APPLICATIONS

The present application claims priority under 35 U.S.C. § 119 to Chinese patent application 202210697810.1 entitled "Optical Film and Preparation Method Therefor, and Display Device" and filed on Jun. 20, 2022, the contents of which are incorporated herein by reference in their entirety.

FIELD

The present disclosure relates to the technical field of display, in particular to an optical film and a preparation method therefor, and a display device.

BACKGROUND

A liquid crystal display device generally comprises a liquid crystal display (LCD for short) panel and a backlight module, the backlight module is disposed on a backlight side of the LCD and is used for providing a light source for the LCD so that an image is displayed on the LCD.

The backlight transmittance of the LCD is usually only about 5%; if the contrast ratio is increased, the transmittance is usually lower, brighter backlight is required. At present, dual brightness enhancement films (DBEF for short) have been used in the LCD, so that a component in the same direction as a transmission axis of a lower polarizer of the LCD in natural light emitted by the backlight module is allowed to pass through, a vertical component returns to the backlight, returned light energy becomes natural light again after being reflected and refracted repeatedly, so that part of the energy can pass through the DBEF so as to be recycled. However, part of energy can be only converted in a target polarization direction after the polarized light reflected by the DBEF is reflected and refracted repeatedly, and the energy is repeatedly absorbed by each layer of film in this process, which causes great waste and limits the ability of the DBEF increasing the utilization ratio of the backlight.

SUMMARY

The objectives of the present disclosure are to provide an optical film and a preparation method therefor, and a display device. This optical film can convert natural light emitted by a backlight module into polarized light in a required polarization direction as much as possible, thereby increasing the utilization ratio of backlight.

In a first aspect, an embodiment of the present disclosure provides an optical film, including a light transmitting substrate as well as a magnetic powder and a magneto-optical medium disposed in the light transmitting substrate, the magnetic powder being used for forming a surface magnetic field, and the magneto-optical medium being located in the surface magnetic field, so that a polarization direction of linearly polarized light is rotated after the linearly polarized light passes through the magneto-optical medium.

In a second aspect, an embodiment of the present disclosure further provides a preparation method for the optical film as mentioned above, including: providing a light transmitting substrate, a magnetic powder and a magneto-optical medium; placing the magnetic powder into a magnetic field for magnetization; heating and curing the magnetized magnetic powder, the magneto-optical medium and the light transmitting substrate to form a film; and placing the film into the magnetic field for remagnetization.

In a third aspect, an embodiment of the present disclosure further provides a display device, including a liquid crystal display panel; a backlight module disposed on a backlight side of the liquid crystal display panel and used for providing a light source for the liquid crystal display panel; the backlight module including a backplane as well as a reflector plate, an optical film and a brightness enhancement film sequentially disposed on the backplane, wherein the optical film is any optical film as mentioned above; a first polarizer disposed on a light-emitting side of the liquid crystal display panel; and a second polarizer disposed between the liquid crystal display panel and the backlight module.

According to the optical film and the preparation method therefor, and the display device provided in the embodiments of the present disclosure, the magnetic powder and the magneto-optical medium are disposed in the light transmitting substrate, the magnetic powder is used for forming the surface magnetic field, and the magneto-optical medium is located in the surface magnetic field, so that the polarization direction of the linearly polarized light is rotated after the linearly polarized light passes through the magneto-optical medium. When being applied to the backlight module of the display device, this optical film can convert natural light emitted by the backlight module into polarized light in a required polarization direction as much as possible, thereby increasing the utilization ratio of backlight.

BRIEF DESCRIPTION OF THE DRAWINGS

Features, advantages and technical effects of exemplary embodiments of the present disclosure will be described below with reference to accompanying drawings in which the same component adopts the same reference numeral in the accompanying drawings. The accompanying drawings are not drawn according to actual proportions, but are merely used for indicating relative positional relationships. The layer thicknesses of some parts are drawn in an exaggerated manner to facilitate understanding, and the layer thicknesses in the accompanying drawings do not represent a proportional relationship among actual layer thicknesses.

Figure 1:
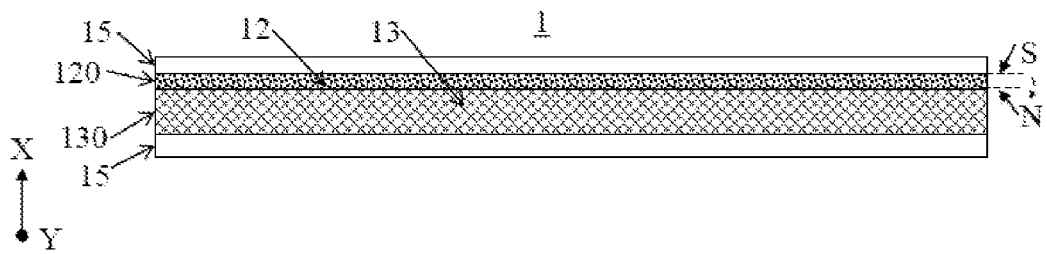
FIG. 1 shows a schematic structural diagram of an optical film provided in a first embodiment of the present disclosure.

Description for Reference Numerals in the Accompanying Drawings:

1, optical film; 11, light transmitting substrate; 12, magnetic powder; 120, layered magnetic layer; 13, magneto-optical medium; 130, magneto-optical medium layer; 14, magneto-optical medium film; 15, protective layer; X, first direction; Y, second direction;

100, backlight module; 101, backplane; 102, reflector plate; 103, brightness enhancement film; 104, light source; 105, support column; 106, light guide plate; 107, light guide plate; 108, optical element; 200, liquid crystal display panel; 300, second polarizer; and 400, first polarizer.

DETAILED DESCRIPTION

Features of various aspects and exemplary embodiments of the present disclosure will be described in detail below. In the following detailed description, many specific details have been proposed so as to facilitate providing full understanding for the present disclosure. However, it is apparent for the skilled in the art that the present disclosure may be implemented under the condition that some of these concrete details are not required. The following description for the embodiments is merely intended to provide better understanding for the present disclosure by showing examples of the present disclosure. In the accompanying drawings and the following description, at least parts of known structures and technologies are not shown, thereby avoiding unwanted ambiguity in the present disclosure. Moreover, in order to implement clearness, the size of a regional structure may be exaggerated. Furthermore, the features, structures or characteristics described hereinafter may be combined into one or more embodiments in any appropriate manners.

Specific structures of an optical film and a preparation method therefor, and a display device provided in all embodiments of the present disclosure will be respectively described below in conjunction with the accompanying drawings.

First Embodiment

FIG. 1 shows a schematic structural diagram of an optical film provided in a first embodiment of the present disclosure.

As shown in FIG. 1, the first embodiment of the present disclosure provides an optical film 1 including a light transmitting substrate 11 as well as a magnetic powder 12 and a magneto-optical medium 13 disposed in the light transmitting substrate 11, the magnetic powder 12 being used for forming a surface magnetic field, and the magneto-optical medium 13 being located in the surface magnetic field, so that a polarization direction of linearly polarized light is rotated after the linearly polarized light passes through the magneto-optical medium 13.

As shown in FIG. 1, the surface magnetic field formed by the magnetic powder 12 of the optical film 1 is provided with an N pole and an S pole disposed oppositely in a first direction X, and a magnetic field direction parallel to the first direction X may be generated between the N pole and the S pole. When the N pole is located on a lower surface of the surface magnetic field and the S pole is located on an upper surface of the surface magnetic field, the magnetic field direction may be a reverse magnetic field direction from bottom to top; and when the N pole is located on the upper surface of the surface magnetic field and the S pole is located on the lower surface of the surface magnetic field, the magnetic field direction may be a forward magnetic field direction from top to bottom.

The light transmitting substrate 11 allows a ray to be transmitted and pass through the optical film 1, wherein solid dots shown in FIG. 1 represent a vibration direction of untransmitted linearly polarized light, i.e. a second direction Y perpendicular to a paper surface, and the first direction X is perpendicular to the second direction Y. According to a Faraday rotation magneto-optical effect, after the linearly polarized light in the second direction Y passes through the magneto-optical medium 13, a polarization direction thereof will be rotated. When being applied to a backlight module 100 (which will be described in detail later), this optical film 1 can convert natural light emitted by the backlight module 100 into polarized light in a required polarization direction as much as possible, thereby increasing the utilization ratio of backlight.

According to the optical film 1 provided in the embodiment of the present disclosure, the magnetic powder 12 and the magneto-optical medium 13 are disposed in the light transmitting substrate 11, the magnetic powder 12 is used for forming the surface magnetic field, and the magneto-optical medium 13 is located in the surface magnetic field, so that the polarization direction of the linearly polarized light is rotated after the linearly polarized light passes through the magneto-optical medium. When being applied to the backlight module 100 of a display device, this optical film can convert natural light emitted by the backlight module 100 into polarized light in a required polarization direction as much as possible, thereby increasing the utilization ratio of backlight.

In some embodiments, the magnetic powder 12 and the light transmitting substrate 11 are compounded to form a layered magnetic layer 120, and the magneto-optical medium 13 and the light transmitting substrate 11 are compounded to form a magneto-optical medium layer 130. The magneto-optical medium layer 130 may be located on a side, away from a light-emitting direction, of the layered magnetic layer 120, or the magneto-optical medium layer 130 may be located on a side, located in the light-emitting direction, of the layered magnetic layer 120.

In some embodiments, the light transmitting substrate is made of any one of silicon dioxide (Sio2), polyethylene (PE), polymethyl methacrylate (PMMA), polycarbonate (PC), polyethylene terephthalate (PET) and glass. Optionally, the magnetic powder comprises a neodymium iron boron (NdFeB) powder. Optionally, the magneto-optical medium comprises any one of an yttrium iron garnet ferrite (YIG), a YIG doped with graphene aerogel (GA) and a CdMgTe crystal.

In some embodiments, the layered magnetic layer 120 is formed by compounding an ultrafine NdFeB magnetic powder 12 and Sio2 aerosol. The magneto-optical medium layer 130 is formed by compounding any one of YIG, YIG doped with GA and the CdMgTe crystal and any one of PE, PMMA, PC, PET and glass. The magneto-optical medium layer 130 is located on a side, away from the light-emitting direction, of the layered magnetic layer 120, and the both are compounded to form the optical film 1.

In some embodiments, the optical film 1 further comprises a protective layer 15 used for protecting the optical film 1 from influences from impurities such as external dust and water vapor and improving the protection performance of the optical film 1. The protective layer 15 may be disposed on a side of a light-emitting surface of the layered magnetic layer 120; or the protective layer 15 may be disposed on a side of a backlight surface of the magneto-optical medium layer 130; or the protective layer 15 may be respectively disposed on the side of the light-emitting surface of the layered magnetic layer 120 and the side of the backlight surface of the magneto-optical medium layer 130.

The protective layer 15 may be made of transparent plastics such as PE, PMMA and PET or a glass medium.

In some embodiments, the magnetic induction intensity of the surface magnetic field of the layered magnetic layer 120 is $B=\pi/(4\times V\times L)$, wherein L is a thickness of the magneto-optical medium 13, and V is a Verdet constant of the magneto-optical medium 13.

It can be known according to a working principle of the Faraday rotation magneto-optical effect that the single rotation angle obtained after the linearly polarized light passes through the magneto-optical medium layer 130 is $\theta=V\times B\times L$. Since the Faraday rotation magneto-optical effect is only related to a direction of a magnetic induction intensity, but is unrelated to a forward magnetic induction intensity or reverse magnetic induction intensity of polarized light, it can be known according to a reflection co-rotation principle of the Faraday rotation magneto-optical effect that after the linearly polarized light passes through the optical film 1 twice, the polarization directions thereof have the same rotation angles and continuous directions. When the two rotation angles are $\theta=\pi/2$, most of untransmitted linearly polarized light can be rotated to form polarized light in a required polarization direction. At the moment, the single rotation angle is $\theta=\pi/4$, and thus, the magnetic induction intensity B of the surface magnetic field of the layered magnetic layer 120 can be calculated.

Figure 2:
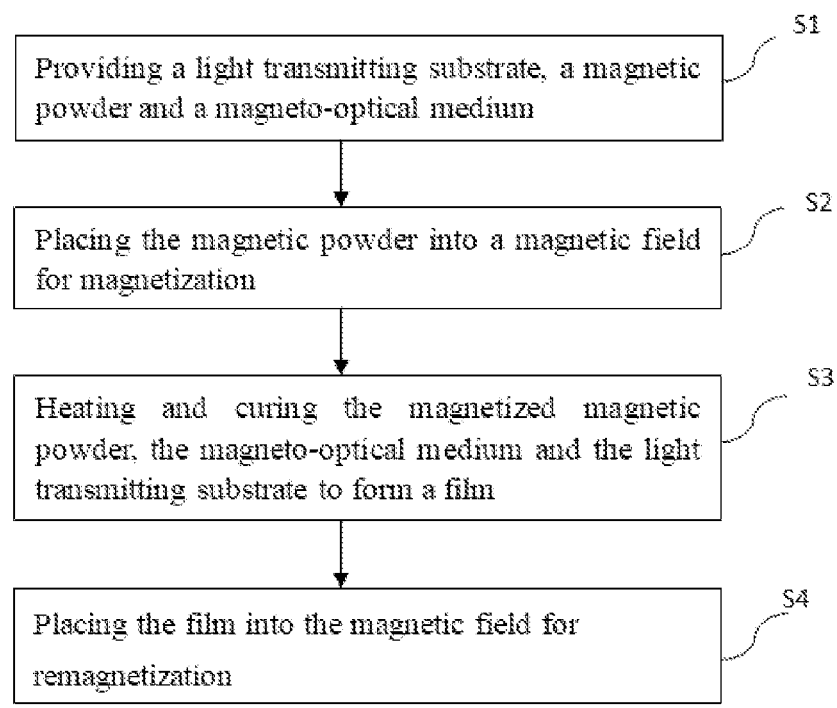
FIG. 2 shows a process block diagram of a preparation method for the optical film shown in FIG. 1.

FIG. 2 shows a process block diagram of a preparation method for the optical film shown in FIG. 1.

As shown in FIG. 2, the preparation method for the optical film shown in FIG. 1 comprises the following steps S1 to S4. Specifically, the preparation method for the optical film comprises:

step S1: a light transmitting substrate 11, a magnetic powder 12 and a magneto-optical medium 13 are provided;

step S2: the magnetic powder 12 is placed into a magnetic field for magnetization;

step S3: the magnetized magnetic powder 12, the magneto-optical medium 13 and the light transmitting substrate 11 are heated and cured to form a film; and step S4: the film is placed into the magnetic field for remagnetization.

In a process that the magnetized magnetic powder 12, the magneto-optical medium 13 and the light transmitting substrate 11 are heated and cured to form the film, the magnetism of the magnetic powder 12 may disappear, and therefore, after being formed, the film needs to be placed in the magnetic field for remagnetization so that the magnetic powder 12 has higher residual magnetism; and after a glare condition of the polarized light of the film is tested, the film is cut into the optical film 1 with a required shape and size.

In some embodiments, in step S3, the step that the magnetized magnetic powder 12, the magneto-optical medium 13 and the light transmitting substrate 11 are heated and cured to form a film comprises:

step S31: the magnetic powder 12 and the light transmitting substrate 11 are compounded to form a layered magnetic layer 120;

In some embodiments, the magnetic powder 12 comprises a NdFeB powder; and optionally, the light transmitting substrate 11 is SiO2 and is compounded in a form of aerosol with the magnetic powder 12 to form the layered magnetic layer 120.

step S32: the magneto-optical medium and the light transmitting substrate are compounded to form a magneto-optical medium layer 130; In some embodiments, the magneto-optical medium comprises any one of YIG, YIG doped with GA and a CdMgTe crystal; and the light transmitting substrate 11 is any one of PE, PMMA, PC, PET and glass.

step S33: the layered magnetic layer 120 and the magneto-optical medium layer 130 are heated and cured to form the film.

In some embodiments, the optical film 1 further comprises a protective layer 15 used for protecting the optical film 1 from influences from impurities such as external dust and water vapor and improving the protection performance of the optical film 1. The protective layer 15 may be disposed on a side of a light-emitting surface of the layered magnetic layer 120; or the protective layer 15 may be disposed on a side of a backlight surface of the magneto-optical medium layer 130; or the protective layer 15 may be respectively disposed on the side of the light-emitting surface of the layered magnetic layer 120 and the side of the backlight surface of the magneto-optical medium layer 130. The protective layer 15 may be made of transparent plastics such as PE, PMMA and PET or a glass medium.

Therefore, in the present embodiment, it is possible that the protective layer 15 is compounded with the film formed by heating and curing, and then, the optical film 1 is placed into a magnetic field for remagnetization.

Second Embodiment

Figure 3:
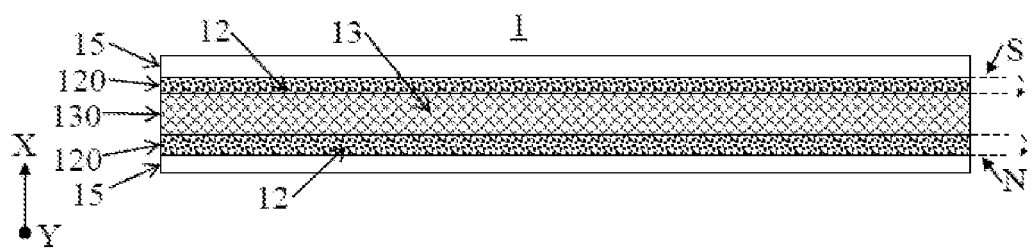
FIG. 3 shows a schematic structural diagram of an optical film provided in a second embodiment of the present disclosure.

FIG. 3 shows a schematic structural diagram of an optical film provided in a second embodiment of the present disclosure.

As shown in FIG. 3, an embodiment of the present disclosure further provides an optical film 1 similar to the optical film 1 in the first embodiment in structure except that the magneto-optical medium layer 130 is sandwiched between two layered magnetic layers 120.

In some embodiments, the magnetic powder 12 and the light transmitting substrate 11 are compounded to form the layered magnetic layers 120, the magneto-optical medium 13 and the light transmitting substrate 11 are compounded to form a magneto-optical medium layer 130, and the magneto-optical medium layer 130 is sandwiched between the two layered magnetic layers 120. The magnetic powder of each layered magnetic layers 120 is magnetized in the magnetic field before being prepared into a layered structure, and directions of magnetic induction intensities of the two layered magnetic layers 120 are the same, so that the two layered magnetic layers 120 attract to each other to clamp the magneto-optical medium layer 130, thereby improving the compounding firmness.

In some embodiments, a preparation method for the optical film 1 in the second embodiment of the present disclosure is similar to the preparation method for the optical film 1 in the first embodiment except that the preparation method in step S3 is different, i.e. the step that the magnetized magnetic powder 12, the magneto-optical medium 13 and the light transmitting substrate 11 are heated and cured to form a film is different.

In some embodiments, step S3 that the magnetized magnetic powder 12, the magneto-optical medium 13 and the light transmitting substrate 11 are heated and cured to form a film comprises:

step S31: the magnetic powder 12 and the light transmitting substrate 11 are compounded to form layered magnetic layers 120; optionally, the magnetic powder 12 comprises a NdFeB powder; and optionally, the light transmitting substrate 11 is SiO2 and is compounded in a form of aerosol with the magnetic powder 12 to form the layered magnetic layers 120;

step S32: the magneto-optical medium 13 and the light transmitting substrate 11 are compounded to form a magneto-optical medium layer 130; optionally, the magneto-optical medium comprises any one of YIG, YIG doped with GA and a CdMgTe crystal; and the light transmitting substrate 11 is any one of PE, PMMA, PC, PET and glass; and step S33: the magneto-optical medium layer 130 is sandwiched between the two layered magnetic layer 120 and are heated and cured to form the film.

In some embodiments, the optical film 1 further comprises a protective layer 15 used for protecting the optical film 1 from influences from impurities such as external dust and water vapor and improving the protection performance of the optical film 1. The protective layer 15 may be disposed on a side of a light-emitting surface of the layered magnetic layer 120 in a light-emitting direction or a side of a backlight surface of the layered magnetic layer 120 in a backlight direction; or the protective layer 15 may be respectively disposed on a side of each of outer surfaces of the two layered magnetic layers 120. The protective layer 15 may be made of transparent plastics such as PE, PMMA and PET or a glass medium.

Therefore, in the present embodiment, it is possible that the protective layer 15 is compounded with the film formed by heating and curing, and then, the optical film 1 is placed into a magnetic field for remagnetization.

Third Embodiment

Figure 4:
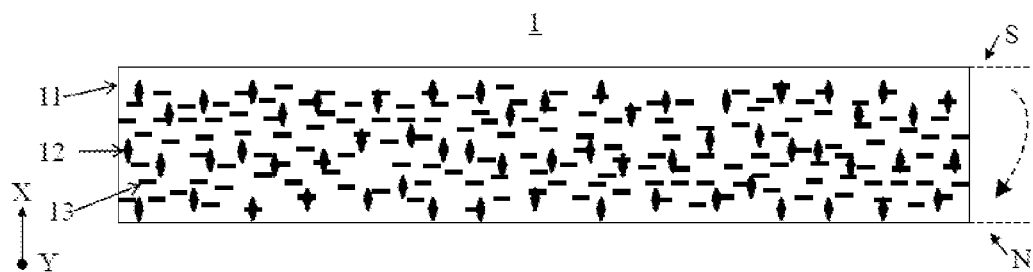
FIG. 4 shows a schematic structural diagram of an optical film provided in a third embodiment of the present disclosure.

FIG. 4 shows a schematic structural diagram of an optical film provided in a third embodiment of the present disclosure.

As shown in FIG. 4, an embodiment of the present disclosure further provides an optical film 1 similar to the optical film 1 in the first embodiment in structure except that the light transmitting substrate 11, the magnetic powder 12 and the magneto-optical medium 13 are compounded to form a layered film, the magneto-optical medium 13 is of a flake structure, and a plane where the flake structure is located is perpendicular to a magnetic field direction of the surface magnetic field.

In some embodiments, SiO2 aerogel, an ultrafine NdFeB magnetic powder and a magneto-optical medium powder (such as YIG, YIG doped with Ga or a CdMgTe crystal) are formed into a mixed powder, and the mixed powder is placed in a magnetic field for magnetizing the magnetic powder 12 by vibration. A film is prepared by heating and curing and is then placed into the magnetic field for secondary magnetization.

As shown in FIG. 4, a magnetic field direction of the magnetic powder 12 is a first direction X, particles of the magnetic powder 12 are rhombic, the magneto-optical medium 13 is of the flake structure, and a plane where the flake structure of the magnetized magneto-optical medium 13 is located is perpendicular to the magnetic field direction of the surface magnetic field. At the moment, the optical film 1 shows an atomization effect, which can improve the uniformity of backlight; and the linearly polarized light cannot obviously deviate when passing through the magneto-optical medium 13, and therefore, good permeability is achieved. It can be understood that the magneto-optical medium 13 may also be of a sphere or other particle shapes, but is not limited to the flake structure.

In some embodiments, a preparation method for the optical film 1 in the third embodiment of the present disclosure is similar to the preparation method for the optical film 1 in the first embodiment except that the preparation method in step S3 is different, i.e. the step that the magnetized magnetic powder 12, the magneto-optical medium 13 and the light transmitting substrate 11 are heated and cured to form a film is different.

In some embodiments, step S3 that the magnetized magnetic powder 12, the magneto-optical medium 13 and the light transmitting substrate 11 are heated and cured to form a film comprises:

the light transmitting substrate 11, the magnetic powder 12 and the magneto-optical medium 13 are compounded to form a layered film, wherein the magneto-optical medium 13 is of a flake structure, and a plane where the flake structure is located is perpendicular to a magnetic field direction of the surface magnetic field.

In some embodiments, the optical film 1 further comprises a protective layer 15 used for protecting the optical film 1 from influences from impurities such as external dust and water vapor and improving the protection performance of the optical film 1. The protective layer 15 may be disposed on a side of a light-emitting surface of the layered magnetic layer 120 in a light-emitting direction or a side of a backlight surface of the layered magnetic layer 120 in a backlight direction; or the protective layer 15 may be respectively disposed on a side of each of outer surfaces of the two layered magnetic layers 120. The protective layer 15 may be made of transparent plastics such as PE, PMMA and PET or a glass medium.

Therefore, in some embodiments, it is possible that the protective layer 15 is compounded with the film formed by heating and curing, and then, the optical film 1 is placed into a magnetic field for remagnetization.

Figure 5:
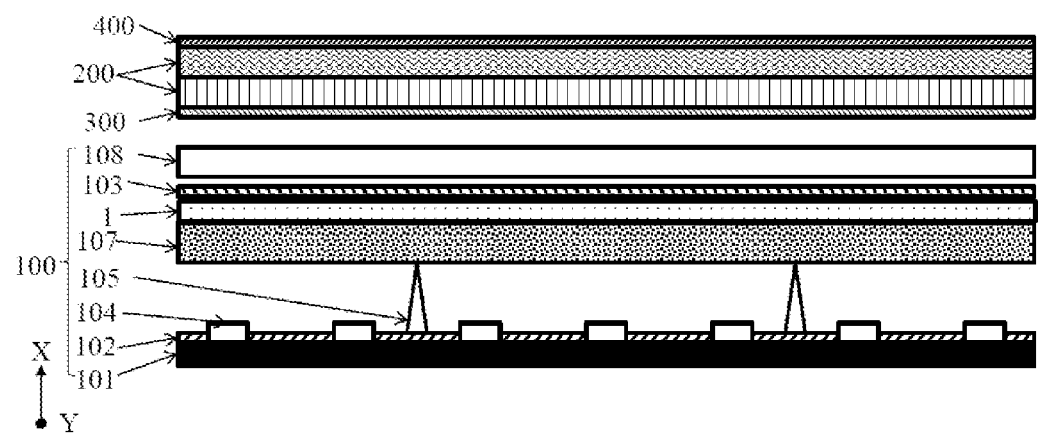
FIG. 5 shows a schematic structural diagram of a display device provided in an embodiment of the present disclosure.
Figure 6:
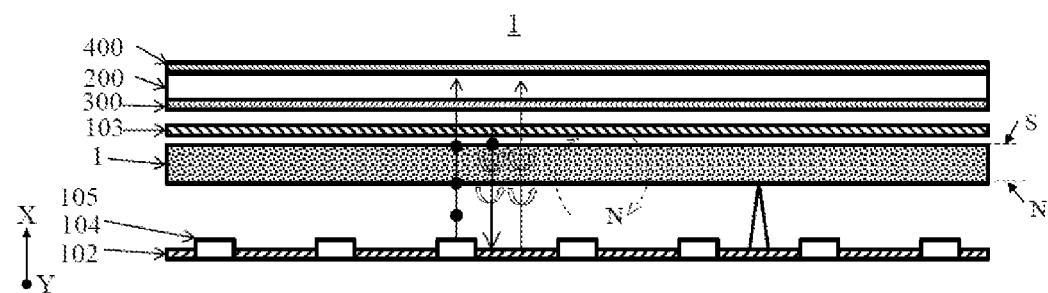
FIG. 6 shows a schematic diagram of an optical path of a backlight module of the display device shown in FIG. 5.

FIG. 5 shows a schematic structural diagram of a display device provided in an embodiment of the present disclosure, and FIG. 6 shows a schematic diagram of an optical path of a backlight module of the display device shown in FIG. 5.

As shown in FIG. 5 and FIG. 6, an embodiment of the present disclosure further provides a display device, including a backlight module 100, a liquid crystal display panel 200, a first polarizer 400 and a second polarizer 300.

The backlight module 100 is disposed on a backlight side of the liquid crystal display panel 200 and is used for providing a light source for the liquid crystal display panel 200; and the backlight module 100 comprises a backplane 101 as well as a reflector plate 102, an optical film 1 and a brightness enhancement film 103 sequentially disposed on the backplane 101, wherein the optical film 1 is any optical film 1 as mentioned above.

The first polarizer 400 is disposed on a light-emitting side of the liquid crystal display panel 200, and the second polarizer 300 is disposed between the liquid crystal display panel 200 and the backlight module 100.

The liquid crystal display panel 200 is a non-emissive light receiving element, the backlight module 100 is disposed on a side of a backlight surface of the liquid crystal display panel 200 and is used for providing a light source for the liquid crystal display panel 200 so that an image is displayed on the liquid crystal display panel 200. The liquid crystal display panel 200 comprises an array substrate, a color film substrate 23 opposite to the array substrate and a liquid crystal layer disposed between the array substrate and the color film substrate. The liquid crystal layer comprises a plurality of liquid crystal molecules which are usually rodlike, not only can flow like a liquid, but also have certain crystal features. When the liquid crystal molecules are located in an electric field, an arrangement direction thereof may be changed with the variation of the electric field. The liquid crystal display panel 200 controls the rotation of the liquid crystal molecules of the liquid crystal layer by applying a driving voltage to the array substrate and the color film substrate so that a ray provided by the backlight module 100 is refracted to generate a picture.

In some embodiments, the display device further comprises the first polarizer 400 located on a side of a light-emitting surface of the liquid crystal display panel 200 and a second polarizer 300 located between the liquid crystal display panel 200 and the backlight module 100, and the second polarizer 300 and the first polarizer 400 can make incident light of the liquid crystal display panel 200 polarize so as to allow light vibrating only in one direction to be transmitted.

As shown in FIG. 6, the backlight module 100 comprises the backplane 101 as well as the reflector plate 102, the optical film 1 and the brightness enhancement film 103 sequentially disposed on the backplane 101.

The brightness enhancement film 103 is used for transmitting linearly polarized light in a first direction X and reflecting linearly polarized light in a second direction Y; the optical film 1 can generate a magnetic field parallel to the first direction X, so that a polarization direction of the linearly polarized light in the second direction Y is rotated after the linearly polarized light passes through the optical film 1; and the reflector plate 102 is used for reflecting the rotated linearly polarized light, wherein the first direction X is the light-emitting direction of the backlight module 100, and the second direction Y is perpendicular to the first direction X.

As shown in FIG. 6, the backlight module 100 is a direct-light-type backlight module and further comprises a light source 104, and light emitted by the light source 104 is natural light. The brightness enhancement film 103 has polarization property and only allows a light component of which a vibration direction and a transmission direction are parallel to pass through. Therefore, light energy in the same direction (i.e. the first direction X) as a transmission axis of the second polarizer 300 of the liquid crystal display panel 200 in the natural light passes through the brightness enhancement film 103 so as to be used for the displaying of the liquid crystal display panel 200, and light energy perpendicular to the transmission axis (i.e. the second direction Y perpendicular to a paper surface) of the second polarizer 300 in the natural light is reflected by the brightness enhancement film 103 so that the linearly polarized light in the second direction Y generates a magneto-optical effect when passing through the magnetic field generated by the optical film 1 and parallel to the first direction X, wherein the magneto-optical effect is a Faraday rotation magneto-optical effect.

According to the Faraday rotation magneto-optical effect, a polarization direction of linearly polarized light, not passing through the brightness enhancement film 103, in the second direction Y is rotated after the linearly polarized light passes through the optical film 1. As shown in FIG. 6, solid dots represent a vibration direction of untransmitted linearly polarized light, i.e. the second direction Y perpendicular to the paper surface, and a hollow arrow represents a rotation direction of the linearly polarized light. It is assumed that a rotation angle is θ1, the rotated linearly polarized light is reflected after reaching the reflector plate 102, the reflected linearly polarized light is rotated again after passing through the optical film 1, and the rotation angle is θ2. Optionally, the reflector plate 102 may be a specular reflector plate or a diffusive reflector plate.

Since the Faraday rotation magneto-optical effect is only related to a direction of a magnetic induction intensity, but is unrelated to a forward magnetic induction intensity or reverse magnetic induction intensity of polarized light, it can be known according to a reflection co-rotation principle of the Faraday rotation magneto-optical effect that after the linearly polarized light passes through the optical film 1 twice, the polarization directions thereof have the same rotation angles θ2 and θ1 and continuous directions. In this way, when the linearly polarized light rotated twice in the magnetic field reaches the brightness enhancement film 103, the polarization direction of the linearly polarized light is rotated by an angle which is 2 times as much as θ1 or θ2.

At the moment, the energy of the linearly polarized light is divided into two parts again: the light energy in the same direction (i.e. the first direction X) as the transmission axis of the second polarizer 300 passes through the brightness enhancement film 103 so as to be used for the displaying of the liquid crystal display panel 200, and the light energy perpendicular to the transmission axis (i.e. the second direction Y) of the second polarizer 300 is reflected by the brightness enhancement film 103 again. After being reflected for several times, most of the linearly polarized light, reflected by the brightness enhancement film 103, in the second direction Y can be converted into the linearly polarized light, capable of passing through the brightness enhancement film 103, in the first direction X, so that waste caused by absorbing the ray by each film layer is reduced, and the utilization ratio of backlight is increased.

According to the display device provided in an embodiment of the present disclosure, the optical film 1 is disposed between the reflector plate 102 and the brightness enhancement film 103 on the backplane 101 of the backlight module 100, and the optical film 1 can generate the magnetic field parallel to the light-emitting direction, so that the polarization direction of the linearly polarized light reflected by the brightness enhancement film 103 is rotated after the linearly polarized light passes through the optical film 1; and the reflector plate 102 is used for reflecting the rotated linearly polarized light, so that most of the linearly polarized light reflected by the brightness enhancement film 103 can be converted into the linearly polarized light capable of passing through the brightness enhancement film 103, the efficiency of the polarized light passing through the brightness enhancement film 103 is greatly increased, waste caused by absorbing the ray by each film layer is reduced, and the utilization ratio of backlight is increased.

In some embodiments, the linearly polarized light in the second direction Y is converted into the linearly polarized light in the first direction X after being reflected between the brightness enhancement film 103 and the reflector plate 102 for N times, and $N=\pi/(4\times B\times V\times L)$, wherein L is a thickness of a magneto-optical medium film 14, V is a Verdet constant of the magneto-optical medium film 14, and B is a magnetic induction intensity of a magnetic field generated by the layered magnetic layer 120 of the optical film 1 and parallel to the first direction X.

In some embodiments, it can be known according to a working principle of the Faraday rotation magneto-optical effect that the single rotation angle obtained after the linearly polarized light passes through the magneto-optical medium film 14 is $\theta=V\times B\times L$, then, a rotation angle obtained when a ray reflected for N times by the reflector plate 102 reaches the lower surface of the brightness enhancement film 103 is $2\times N\times\theta=2\times N\times V\times B\times L$.

When $2\times N\times V\times B\times L\approx\pi/2$, the linearly polarized light, reflected by the brightness enhancement film 103, in the second direction Y is completely converted into the linearly polarized light in the first direction X and is emitted through the brightness enhancement film 103, at the moment, $N=\pi/(4\times V\times B\times L)$. By reasonably setting a value of B and selecting the magneto-optical medium film 14, the order of magnitude of N can be effectively reduced, so that the number of reflections can be reduced as much as possible, then, waste caused by absorbing the ray by each film layer is reduced, and the utilization ratio of backlight is increased.

Under an ideal condition that N=1, by reflecting the linearly polarized light, reflected by the brightness enhancement film 103, in the second direction Y once, the polarization direction can be rotated by $\pi/2$, and the linearly polarized light in the second direction Y can be converted into the linearly polarized light in the first direction X, which passes through the brightness enhancement film 103 so as to be reused, so that the utilization ratio of backlight is increased to the maximum extent.

In some embodiments, the backplane 101 is at least partially made of a magnetic shielding material including, for example, an iron aluminum alloy, is prepared by adopting a process such as stamping and is used for avoiding a phenomenon that external metal impurities generates interference to the magnetic field generated by the magnetic powder 12 in the optical film 1 to affect the conversion efficiency of the linearly polarized light and then reduce the utilization ratio for backlight. The magnetic shielding material may also protect the backlight module 100 from being easily broken under the impact of an external force. A part, not made of the magnetic shielding material, of the backplane 101 may be made of a plastic material such as polyimide, polycarbonate, polyether sulfone, polyethylene terephthalate and polyethylene, and this part can be used for bonding magnetic parts and magnetically pasting and installing other parts, etc.

In some embodiments, the shape of the backplane 101 may be the same as that of the liquid crystal display panel 200 using the backlight module 100. For example, when the liquid crystal display panel 200 is circular, the backplane 101 of the backlight module 100 used by the liquid crystal display panel 200 is also circular. The shape of the backplane 101 can be changed in different embodiments.

In some embodiments, the brightness enhancement film 103 comprises a core layer and a coating layer, diffusion particles and glue can be mixed to obtain the coating layer, and the coating layer is uniformly coated on the core layer and is then dried to obtain the brightness enhancement film 103.

In some embodiments, the backlight module 100 is a direct-light-type backlight module, the light source 104 is disposed on a side, away from the backplane 101, of the optical film 1, the light source 104 is a lamp panel including a circuit board and a plurality of light-emitting elements distributed in an array on the circuit board; and the reflector plate 102 is provided with open slots H corresponding to the light-emitting elements, and support columns 105 are disposed between the reflector plate 102 and the optical film 1.

In some embodiments, each of the light-emitting elements may be any one of a micro light-emitting diode (Micro-LED) or a submillimeter light-emitting diode (Mini-LED). The Micro-LED refers to an LED chip of which the grain size is below 100 microns, and the Mini-LED refers to an LED chip of which the grain size is about 100-300 microns. In other embodiments, each of the light-emitting elements may also be a light-emitting diode (LED) with a regular size, the LED, the Mini-LED or the Micro-LED may be displayed as a self-luminous light-emitting element and has the advantages such as low power consumption, high brightness, high resolution, high color saturation, high response speed, longer life and higher efficiency.

As shown in FIG. 1, the backlight module 100 is a direct-light-type backlight module, the backlight module 100 further comprises an optical element 108 located on sides, away from the backplane 101, of the light-emitting elements, and an orthographic projection of the optical element 108 on the backplane 101 covers orthographic projections of the plurality of light-emitting elements on the backplane 101.

The optical film 1 can support the brightness enhancement film 103 and the other optical element 108 which is an integrated optical film layer obtained by processing on the basis of the brightness enhancement film 103 and integrating optical processing functions such as reflection, refraction, scattering and convergency.

In some embodiments, a light guide plate 107 is further disposed between the reflector plate 102 and the optical film 1, and the light guide plate 107 may be a diffusion plate. The diffusion plate is fixedly connected to the optical element 108 by a transparent optical adhesive, so that a phenomenon that relative displacement occurs between the diffusion plate and the optical element 108 to affect a light-emitting effect of the backlight module 100 is avoided.

The diffusion plate is used for diffusing light emitted by the light-emitting elements to balance the brightness of the entire backlight module 100. The optical element 108 may include, for example, a prismatic lens and a protective sheet. The prismatic lens is used for controlling a propagation direction of light diffused by the diffusion plate so that the propagation direction of the light is perpendicular to the liquid crystal display panel 200. The protective sheet is used for protecting a prism of the prismatic lens from being scratched, etc. The protective sheet can also be used for widening a viewing angle which becomes narrow due to the prismatic lens.

The reflector plate 102 is provided with the open slots corresponding to the light-emitting elements, and the open slots can prevent the reflector plate 102 from shielding a ray emitted by the light-emitting elements. Optionally, the reflector plate 102 can be made of a plastic material such as PET, PC, PS, etc. The reflector plate 102 may further include a high-reflection coating, such as TiO2, coated on the plastic material to increase a light reflection coefficient. The reflector plate 102 can reflect a ray reflected from the optical element 108 to the backplane 101 to the optical element 108 again, so that the light-emitting efficiency of the backlight module 100 is increased, and finally, the brightness of backlight of the backlight module 100 is enhanced.

In some embodiments, the support columns 105 are elastic columns telescopic in an axial direction thereof, and ends in the axial direction of the supporting columns 105 are connected to the reflector plate 102, and the other ends are abutted against the light guide plate 107.

In some embodiments, the supporting columns 105 are elastic ejector pins internally provided with springs so as to be telescopic along with an optical distance. There are a plurality of supporting columns 105, and ends, away from the reflector plate 102, of the plurality of supporting columns 105 are respectively abutted against the optical film 1, so that the phenomenon that the optical element 108 is inwards sunken on a middle position due to the gravity thereof to affect a light-emitting effect is avoided. Such a backlight module 100 with the plurality of supporting columns 105 is particularly suitable for a display device with a larger size, such as a 67-inch or larger display device.

The supporting columns 105 are disposed in an optical cavity of the backlight module 100 and may absorb the ray emitted by the optical element to affect an optical quality. The supporting columns 105 is disposed between the reflector plate 102 and the light guide plate 107 and may extrude and even damage the reflector plate 102. Furthermore, if the supporting columns 105 fall off during use, they will be remained in the optical cavity to make an abnormal sound and affect an optical display effect. Therefore, in a 32-inch or smaller display device, the supporting columns 105 can be generally omitted.

Figure 7:
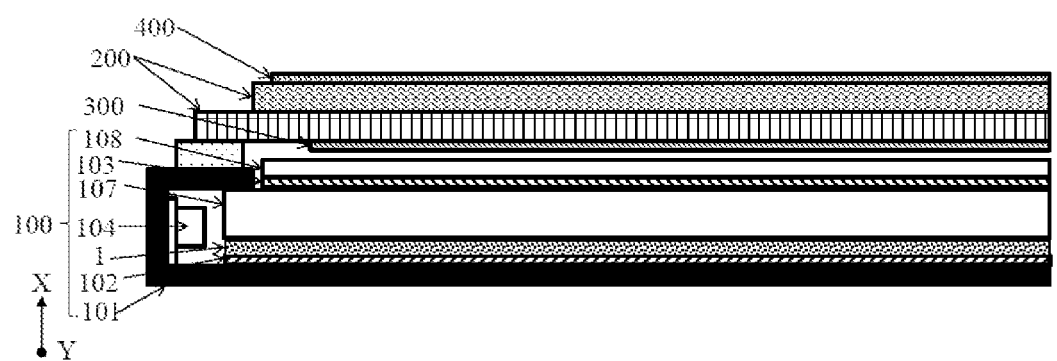
FIG. 7 shows a schematic structural diagram of another display device provided in an embodiment of the present disclosure.

FIG. 7 shows a schematic structural diagram of another display device provided in an embodiment of the present disclosure.

As shown in FIG. 7, an embodiment of the present disclosure further provides a display device similar to the display device shown in FIG. 5 except that the backlight module 100 is an edge-lit backlight module, i.e. The light source 104 is disposed on a light incident side of the light guide plate 107. At the moment, the light guide plate 107 is a light guide plate, the optical film 1 may be disposed on a side of a backlight surface of the light guide plate 107. Compared with the direct-light-type backlight module, the edge-lit backlight module is thinner.

In some embodiments, the backlight module 100 comprises a light source 104 and a light guide plate 107, and the light source 104 is a light bar disposed on the light incident side of the light guide plate 107. The light bar generally comprises a plurality of light-emitting elements arranged in line, and each of the light-emitting elements may be a light-emitting diode (LED) with a regular size.

In some embodiments, the light guide plate 107 may be made of a PMMA material with a high transmittance, a MS material with excellent heat resistance and moisture resistance, light guiding artificial resin, etc. Light emitted by the light source 104 enters a main part from the light incident side of the light guide plate 107 and is then emitted from a side of a light-emitting surface of the main part to enter the liquid crystal display panel 200, and then, a point light source or a line light source generated by the light source 104 is converted into a surface light source, so that the entire area of the liquid crystal display panel 200 is illuminated with the basically consistent brightness.

In some embodiments, the backlight module 100 further comprises the brightness enhancement film 103 and the optical element 108 which are located on the light guide plate 107.

In some embodiments, the brightness enhancement film 103 comprises a core layer and a coating layer, diffusion particles and glue can be mixed to obtain the coating layer, and the coating layer is uniformly coated on the core layer and is then dried to obtain the brightness enhancement film 103.

In some embodiments, the backplane 101 comprises a bottom plate and a bent part, a U-shaped accommodating cavity is formed between the bottom plate and the bent part, and the light bar and a part of the light guide plate 107 are located in the U-shaped accommodating cavity. The bent part comprises a first supporting plane and a second supporting plane which are intersected, the light bar is located on the first supporting plane, and the second supporting plane is parallel to the bottom plate.

In some embodiments, a light shielding part is disposed between the second supporting plane of the backplane 101 and an array substrate of the liquid crystal display panel 200. The light shielding part is generally black and may be formed by adding black color master batches into plastics, or the light shielding part is a black glue layer, etc. to avoid a phenomenon that a ray from the light bar leaks from a gap between the light guide plate 107 and the backplane 101 to result in light leakage on an edge.

The optical element 108 may include a lower diffusion film, a lower brightness enhancement film, an upper brightness enhancement film and an upper diffusion film stacked from bottom to top, and a light-emitting surface of at least one of the lower brightness enhancement film and the upper brightness enhancement film is provided with a prism structure, so that the ray emitted by the light guide plate 107 generates a convergence effect, and then, the brightness within a specific viewing angle range of the backlight module 100 can be improved.

Figure 8:
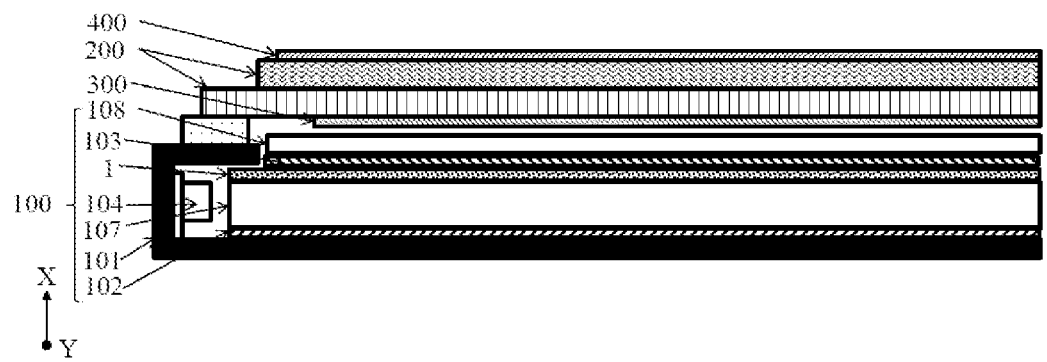
FIG. 8 shows a schematic structural diagram of further display device provided in an embodiment of the present disclosure.

FIG. 8 shows a schematic structural diagram of further display device provided in an embodiment of the present disclosure.

As shown in FIG. 8, an embodiment of the present disclosure further provides a display device similar to the display device shown in FIG. 7 except that the optical film 1 of the edge-lit backlight module can be disposed on a side of the light-emitting surface of the light guide plate 107.

In some embodiments, the light source 104 is a light bar, the light guide plate 107 is disposed between the reflector plate 102 and the optical film 1, the light bar is disposed on the light incident side of the light guide plate 107, and the optical film 1 is located between the light guide plate 107 and the brightness enhancement film 103. The light bar generally comprises a plurality of light-emitting elements arranged in line, and each of the light-emitting elements may be a light-emitting diode (LED) with a regular size.

In some embodiments, the light guide plate 107 may be made of a PMMA material with a high transmittance, a MS material with excellent heat resistance and moisture resistance, light guiding artificial resin, etc. Light emitted by the light source 104 enters a main part from the light incident side of the light guide plate 107 and is then emitted from a side of a light emitting surface of the main part to enter the liquid crystal display panel 200, and then, a point light source or a line light source generated by the light source 104 is converted into a surface light source, so that the entire area of the liquid crystal display panel 200 is illuminated with the basically consistent brightness.

In some embodiments, the backplane 101 comprises a bottom plate and a bent part, a U-shaped accommodating cavity is formed between the bottom plate and the bent part, and the light bar and a part of the light guide plate 107 are located in the U-shaped accommodating cavity. The bent part comprises a first supporting plane and a second supporting plane which are intersected, the light bar is located on the first supporting plane, and the second supporting plane is parallel to the bottom plate.

In some embodiments, a light shielding part is disposed between the second supporting plane of the backplane 101 and an array substrate of the liquid crystal display panel 200. The light shielding part is generally black and may be formed by adding black color masterbatches into plastics, or the light shielding part is a black glue layer, etc. to avoid a phenomenon that a ray from the light bar leaks from a gap between the light guide plate 107 and the backplane 101 to result in light leakage on an edge.

It can be understood that the technical solution of the optical film 1 provided in each embodiment of the present disclosure can be widely applied to backlight modules of various liquid crystal display panels such as a TN (Twisted Nematic) display panel, an IPS (In-Plane Switching) display panel, a VA (Vertical Alignment) display panel and an MVA (Multi-Domain Vertical Alignment) display panel.

It should be easily understood that "on", "over" and "above" in the present disclosure are to be interpreted in the broadest manner, so that "on" not only refers to "directly located on a certain object", but also comprises a meaning of "on a certain object" with intermediate features or layers there between, and "over" or "above" not only comprises a meaning of "over a certain object" or "above a certain object", but also comprises a meaning of "over a certain object" or "above a certain object" without intermediate features or layers there between (i.e. directly located on a certain object).

The term "layer" used herein may refer to a material part on an area with a certain thickness. The layer may extend on an entire lower layer structure or overlying structure, or may be within a range narrower than the range of the lower layer or overlying structure. Furthermore, the layer may be in an area of a homogeneous or heterogeneous continuous structure and is thinner than the continuous structure. For example, the layer may be located between a top surface and a bottom surface of the continuous structure or between any paired transverse planes on the top surface and the bottom surface. The layer may transversely extend, vertically extend and/or extend along a conical surface. A base substrate may be a layer, may include one or more layers therein, and/or may be provided with one or more layers located on, above and/or below. The layer may include a plurality of layers. For example, interconnected layers may include one or more conductors and contact layers (in which contacts, interconnection lines and/or via holes are formed) and one or more dielectric layers.

Finally, it should be noted that the above-mentioned embodiments are merely intended to describe the technical solutions of the present disclosure, rather than to limit the present disclosure. Although the present disclosure has been described in detail with reference to the aforementioned embodiments, those of ordinary skill in the art should be understood that they may still modify the technical solutions recorded in each of the foregoing embodiments or equivalently substitute parts or all of technical features therein; and these modifications or substitutions does not enable the essences of the corresponding technical solutions to depart from the scope of the technical solutions of the embodiments of the present disclosure.

What is claimed is:

1. An optical film, comprising a light transmitting substrate as well as a magnetic powder and a magneto-optical medium disposed in the light transmitting substrate, the magnetic powder being used for forming a surface magnetic field, and the magneto-optical medium being located in the surface magnetic field, so that a polarization direction of linearly polarized light is rotated after the linearly polarized light passes through the magneto-optical medium.

2. The optical film of claim 1, wherein the magnetic powder and the light transmitting substrate are compounded to form a layered magnetic layer, and the magneto-optical medium and the light transmitting substrate are compounded to form a magneto-optical medium layer.

3. The optical film of claim 1, wherein the magnetic powder and the light transmitting substrate are compounded to form layered magnetic layers, the magneto-optical medium and the light transmitting substrate are compounded to form a magneto-optical medium layer, and the magneto-optical medium layer is sandwiched between the two layered magnetic layers.

4. The optical film of claim 1, wherein the light transmitting substrate, the magnetic powder and the magneto-optical medium are compounded to form a layered film, the magneto-optical medium is of a flake structure, and a plane where the flake structure is located is perpendicular to a magnetic field direction of the surface magnetic field.

5. The optical film of claim 1, wherein the light transmitting substrate is made of any one of silicon dioxide, polyethylene, polymethyl methacrylate, polycarbonate, polyethylene terephthalate and glass.

6. The optical film of claim 1, wherein the magneto-optical medium comprises any one of an yttrium iron garnet ferrite, an yttrium iron garnet ferrite doped with graphene aerogel and a CdMgTe crystal.

7. The optical film of any one of claim 2, wherein at least one of a light-emitting surface and a backlight surface of the optical film is further provided with a protective layer.

8. The optical film of claim 7, wherein the protective layer is made of any one of polyethylene, polymethyl methacrylate, polyethylene terephthalate and a glass medium.

9. The optical film of claim 1, wherein the magnetic induction intensity of the surface magnetic field is $B=\pi/(4\times V\times L)$, wherein L is a thickness of the magneto-optical medium, and V is a Verdet constant of the magneto-optical medium.

10. A preparation method for an optical film, comprising:
providing a light transmitting substrate, a magnetic powder and a magneto-optical medium;
placing the magnetic powder into a magnetic field for magnetization;
heating and curing the magnetized magnetic powder, the magneto-optical medium and the light transmitting substrate to form a film; and
placing the film into the magnetic field for remagnetization.

11. The preparation method of claim 10, wherein the step of heating and curing the magnetized magnetic powder, the magneto-optical medium and the light transmitting substrate to form a film comprises:
compounding the magnetic powder and the light transmitting substrate to form a layered magnetic layer;
compounding the magneto-optical medium and the light transmitting substrate to form a magneto-optical medium layer; and
heating and curing the layered magnetic layer and the magneto-optical medium layer to form the film.

12. The preparation method of claim 10, wherein the step of heating and curing the magnetized magnetic powder, the magneto-optical medium and the light transmitting substrate to form a film comprises:
compounding the magnetic powder and the light transmitting substrate to form layered magnetic layers;
compounding the magneto-optical medium and the light transmitting substrate to form a magneto-optical medium layer; and
sandwiching the magneto-optical medium layer between the two layered magnetic layers, and performing heating and curing to form the film.

13. The preparation method of claim 10, wherein the step of heating and curing the magnetized magnetic powder, the magneto-optical medium and the light transmitting substrate to form a film comprises:
compounding the light transmitting substrate, the magnetic powder and the magneto-optical medium to form a layered film, wherein the magneto-optical medium is of a flake structure, and a plane where the flake structure is located is perpendicular to a magnetic field direction of a surface magnetic field.

14. A display device, comprising:
a liquid crystal display panel;
a backlight module disposed on a backlight side of the liquid crystal display panel and used for providing a light source for the liquid crystal display panel; the backlight module comprising a backplane as well as a reflector plate, an optical film and a brightness enhancement film sequentially disposed on the backplane, wherein the optical film comprises a light transmitting substrate as well as a magnetic powder and a magneto-optical medium disposed in the light transmitting substrate, the magnetic powder is used for forming a surface magnetic field, and the magneto-optical medium is located in the surface magnetic field, so that a polarization direction of linearly polarized light is rotated after the linearly polarized light passes through the magneto-optical medium;

a first polarizer disposed on a light-emitting side of the liquid crystal display panel; and a second polarizer disposed between the liquid crystal display panel and the backlight module.

15. The display device of claim 14, wherein the backlight module further comprises a lamp panel disposed on the side, away from the backplane, of the optical film, and the lamp panel comprises a circuit board and a plurality of light-emitting elements distributed in an array on the circuit board; and the reflector plate is provided with open slots corresponding to the light-emitting elements, and support columns are disposed between the reflector plate and the optical film.

16. The display device of claim 15, wherein the backlight module further comprises an optical element located on the sides, away from the backplane, of the light-emitting elements; and a diffusion plate is further disposed between the reflector plate and the optical film, and the diffusion plate is fixedly connected to the optical element by a transparent optical adhesive.

17. The display device of claim 14, wherein the backlight module further comprises a light bar and a light guide plate, and the light guide plate is disposed between the optical film and the brightness enhancement film; or the optical film is disposed between the light guide plate and the brightness enhancement film; and the light bar is disposed on a light incident side of the light guide plate, and the light bar comprises a circuit board and a plurality of light-emitting elements arranged in line on the circuit board.

18. The display device of claim 17, wherein the backlight module further comprises an optical element located on the side, away from the backplane, of the brightness enhancement film, the optical element comprises a lower diffusion film, a lower brightness enhancement film, an upper brightness enhancement film and an upper diffusion film stacked from bottom to top, and a light-emitting surface of at least one of the lower brightness enhancement film and the upper brightness enhancement film is provided with a prism structure.

19. The display device of claim 14, wherein the backplane comprises a bottom plate and a bent part, a U-shaped accommodating cavity is formed between the bottom plate and the bent part, and the light bar and a part of the light guide plate are located in the U-shaped accommodating cavity; and the bent part comprises a first supporting plane and a second supporting plane which are intersected, the light bar is located on the first supporting plane, and the second supporting plane is parallel to the bottom plate.

20. The display device of claim 19, wherein a light shielding part is disposed between the second supporting plane of the backplane and an array substrate of the liquid crystal display panel.

* * * * *